United States Patent Office 2,753,468
Patented July 3, 1956

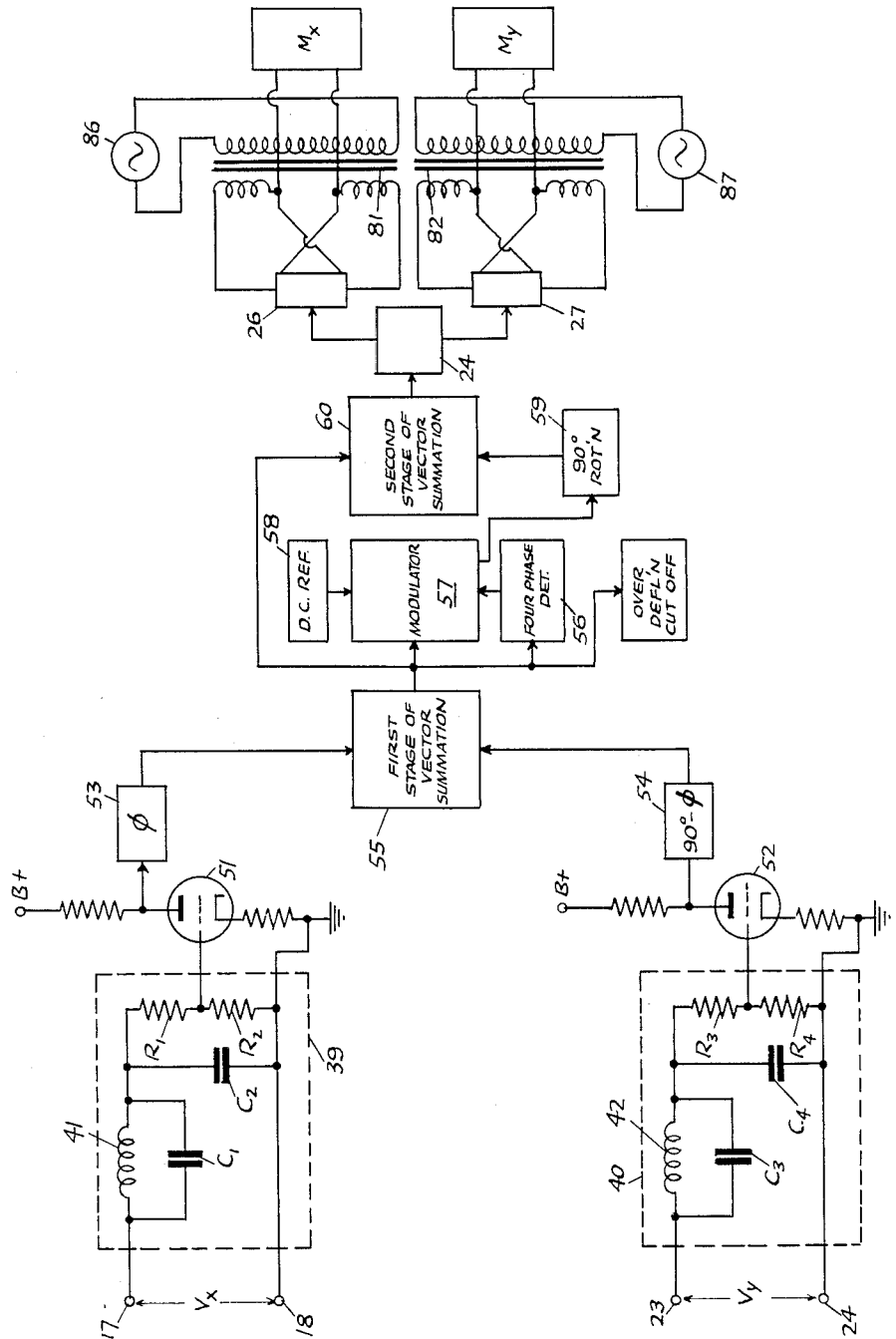

2,753,468

ELECTRONIC POSITION AND MOTION CONTROL SYSTEMS

Amos J. Carr, Jr., Lexington, Mass., assignor to Raytheon Manufacturing Company, Waltham, Mass., a corporation of Delaware Application December 4, 1953, Serial No. 396,238

10 Claims. (Cl. 307—105)

This invention relates to electronic systems for supervising the position and motion of a controllable element, and particularly to a system motivated by two command signal voltages corresponding to two vectorial components of the force acting upon the controllable element.

Patent No. 2,627,055 granted to Carlo L. Calosi on January 27, 1953, illustrates the application of such a system to the control of two complementary force applying motors which cooperate to maintain a stylus and cutting tool in tangential relationship to a template and work piece, respectively, so that the work piece is fashioned to have a contour duplicating that of the template, the stylus (and hence the cutting tool) being moved tangentially along the surface of the template by applying the two motor drives thereto at orthogonally related angles whose vectorial resultant is directed along the tangential line which the stylus is to follow. The actuating voltages for the two driving motors are derived from signal voltages set up by the stylus itself as it moves along the tangential path referred to, the voltages applied to the respective motors depending upon the magnitude and direction of the "stressing force" as it is termed in said patent.

The system illustrated in the patent includes electronic means responsive to stylus deviations from the prescribed tangential course to restore the stylus to said prescribed tangential course, and thereby return the stressing force to the predetermined magnitude and direction. The present invention provides complementary electrical means responsive to momentary stresses of extreme sharpness and operative to attenuate the undesirable transient frequency modulations of the normal, steady state sinusoidal signal voltage, so that the electronic control system is protected from receiving a correspondingly undesirable sharp deviation from its steady state excitation. The described complementary electrical means in the present embodiment of the invention takes the form of an inductance-capacitance network in which the inductance element is a toroidally-constituted coil of conductive wire tending to minimize inductive noise pickup, and thus solving a major problem that would otherwise cause difficulty, in view of the relatively low level of signal strength that may characterize certain applications of the system in transducer-controlled operations. The inductance-capacitance network will also serve to improve the accuracy and efficiency of signal transmission, not only by virtue of the amplification of desired signal frequency band that will result from use of such network, but also by virtue of the transient wave attenuating action above referred to.

Other characteristics and advantages of the invention will become apparent upon examination of the following description of one embodiment thereof, reference being made to the accompanying drawing showing the invention applied to a stylus operating and control system similar in general principles to that of the Calosi patent above referred to but incorporating certain details of the Calosi patent application, Serial No. 405,225, filed December 9, 1953, which details constitute improvements upon the basic system particularly in the matter of improving the deviation correction procedure. The system of the cited patent, as well as the improved system of the cited patent application, is definitely improved by the incorporation of the shock wave attenuating means of the present invention.

In the drawing a sinusoidal signal voltage $V_x$ is shown applied to the grid circuit of an amplifier 51, and a sinusoidal signal voltage $V_y$ to the grid circuit of an amplifier 52, these two amplifiers corresponding to those similarly designated in the cited Calosi patent. As explained and illustrated in the patent, the voltages $V_x$ and $V_y$ are generated by quadrantally-related field windings of a transducer whose armature shaft is extended to constitute the template-engaging stylus above referred to, the magnitude of the generated voltages being proportional to the vectorial components of the stressing force set up in the stylus in response to the combined effect of the two orthogonally-related mechanical drives including the respective motors shown schematically at $M_x$ and $M_y$. However, in lieu of applying the voltages $V_x$ and $V_y$ to the amplifiers directly, the present invention operates to minimize effects of shock and also to improve the signal-to-noise ratio by virtue of the use of the inductance-capacitance networks above referred to, said networks constituting filtering means which improves the steady state wave form generated when the stylus stressing force remains constant, by contributing a resonant gain tending to improve the efficiency of the signal band transmission. In this respect the toroidally-wound inductance coils 41 and 42 of the respective filters are effective in nullifying inductive noise pickup as well as in combining with capacitors $C_1$ to $C_4$ in attenuating shock-induced transient frequency components differing from the signal generator frequency band, and thereby preventing transmission of such momentary stylus deviation effects to the amplifier circuits.

Resistors $R_1$ to $R_4$ supplement the filter circuits in controlling the level of voltage application to the grids of amplifiers 51 and 52.

In consequence of this transient deviation suppressing effect of the filter networks 39 and 40, the signal transmission circuits, and particularly the detector and modulator circuits indicated schematically at 56 and 57, will be relieved of the necessity of correcting the undesirable transient stress deviations of the stylus, and therefore they will confine their functioning to those occasions when there is a relatively sustained stress deviation such as would be caused by the normal template following action of the stylus. Of course, an extreme departure, if continued beyond momentary duration, will bring into operation the over-deflection cut-off 61 which is more fully disclosed in patent application, Serial No. 396,237, filed December 4, 1953. Also as explained more fully in said patent application, and in the Calosi patent and patent application above identified, prolonged deviations in the signal voltage received by modulator 57 disturb the normal grid balance between the normal signal voltage and the pre-fixed reference voltage supplied from D. C. source 58, and correspondingly modify the output of the second voltage summation stage 60, which latter unit transmits the resultant voltage to the voltage dividing unit 24 where it is again resolved into two quadrantally-related components for delivery to the thyratron motor control circuits 26 and 27 which serve to connect the secondaries of transformers 81 and 82 to the stylus operating motors $M_x$ and $M_y$, respectively. The phase related A. C. sources 86 and 87 (normally a common source) supply the primary windings of these transformers, as in the patent applications above identified.

Prior to delivery to the first vector summation stage 55, the voltage outputs of amplifiers 51 and 52 are phase displaced in the units 53 and 54, whose circuits are shown in full in the Calosi patent application above identified. Also as indicated more fully in said application, similar phase displacement occurs in unit 59, interposed between modulator 57 and the second vector summation stage 60.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, means controlled by a stressing force for producing a representative voltage, said means comprising voltage generating means responsive to the degree of deflection of an index element subjected to said stressing force, means for amplifying the generated voltage, and means interposed between said voltage generating means and said amplifying means to attenuate undesired transient frequency components set up in said generating means by momentary shock forces applied to said index element.

2. In combination, means controlled by a stressing force for producing a representative voltage, said means comprising voltage generating means responsive to the degree of deflection of an index element subjected to said stressing force, means for amplifying the generated voltage, and means including an inductance-capacitance combination interposed between said voltage generating means and said amplifying means to attenuate undesired transient frequency components set up in said generating means by momentary shock forces applied to said index element.

3. In combination, means controlled by a stressing force for producing a representative voltage, said means comprising voltage generating means responsive to the degree of deflection of an index element subjected to said stressing force, means for amplifying the generated voltage, and means including a toroidally-wound inductance element interposed between said voltage generating means and said amplifying means to attenuate undesired transient frequency components set up in said generating means by momentary shock forces applied to said index element.

4. In combination, means controlled by a stressing force for producing a representative voltage, said means comprising voltage generating means responsive to the degree of deflection of an index element subjected to said stressing force, means for amplifying the generated voltage, and filtering means interposed between said voltage generating means and said amplifying means to nullify the effect of inductive noise originating at said index element, and to increase the signal frequency band transmission level.

5. In combination, means controlled by a stressing force for producing a representative voltage, said means comprising voltage generating means responsive to the degree of deflection of an index element subjected to said stressing force, means for amplifying the generated voltage, and filtering means interposed between said voltage generating means and said amplifying means to attenuate the modulation effects resulting from generation of undesired transient frequency components set up in said generating means by momentary shock forces applied to said index element.

6. In combination, means controlled by a stressing force for producing a representative voltage, said means comprising voltage generating means responsive to the degree of deflection of an index element subjected to said stressing force, means for utilizing the generated voltage, and means interposed between said voltage generating means and said utilizing means to attenuate undesired transient frequency components set up in said generating means by momentary shock forces applied to said index element.

7. In combination, means controlled by a stressing force for producing a representative voltage, said means comprising voltage generating means responsive to the degree of deflection of an index element subjected to said stressing force, means for utilizing the generated voltage, and means including an inductance-capacitance combination interposed between said voltage generating means and said utilizing means to attenuate undesired transient frequency components set up in said generating means by momentary shock forces applied to said index element.

8. In combination, means controlled by a stressing force for producing a representative voltage, said means comprising voltage generating means responsive to the degree of deflection of an index element subjected to said stressing force, means for utilizing the generated voltage, and means including a toroidally-wound inductance element interposed between said voltage generating means and said utilizing means to attenuate undesired transient frequency components set up in said generating means by momentary shock forces applied to said index element.

9. In combination, means controlled by a stressing force for producing a representative voltage, said means comprising voltage generating means responsive to the degree of deflection of an index element subjected to said stressing force, means for utilizing the generated voltage, and filtering means interposed between said voltage generating means and said utilizing means to nullify the effect of inductive noise originating at said index element, and to increase the signal frequency band transmission level.

10. In combination, means controlled by a stressing force for producing a representative voltage, said means comprising voltage generating means responsive to the degree of deflection of an index element subjected to said stressing force, means for utilizing the generated voltage, and filtering means interposed between said voltage generating means and said utilizing means to attenuate the modulation effects resulting from generation of undesired transient frequency components set up in said generating means by momentary shock forces applied to said index element.

References Cited in the file of this patent

UNITED STATES PATENTS

| | | |
|---|---|---|
| 2,475,245 | Leaver et al. | July 5, 1949 |
| 2,630,007 | Howe et al. | Mar. 3, 1953 |